(12) United States Patent
Carder et al.

(10) Patent No.: US 6,765,874 B1
(45) Date of Patent: Jul. 20, 2004

(54) ATM SERVICE DISRUPTION MEASUREMENT

(75) Inventors: Norman Carder, South Queensferry (GB); Colin Johnstone, Fife (GB)

(73) Assignee: Agilent Technologies, Inc., Palo Alto, CA (US)

( * ) Notice: Subject to any disclaimer, the term of this patent is extended or adjusted under 35 U.S.C. 154(b) by 679 days.

(21) Appl. No.: 09/709,395

(22) Filed: Nov. 13, 2000

(30) Foreign Application Priority Data

Nov. 12, 1999 (GB) ............................................. 9926884

(51) Int. Cl.[7] .............................................. G01R 31/08
(52) U.S. Cl. ......................... 370/244; 714/25; 714/48; 714/704; 714/715; 370/392
(58) Field of Search ............................. 370/252, 395.1, 370/395.51, 392, 394, 241, 242, 216, 503; 714/48, 25, 703, 704, 712, 715

(56) References Cited

U.S. PATENT DOCUMENTS

| | | | | |
|---|---|---|---|---|
| 5,408,461 A | * | 4/1995 | Uriu et al. | 370/248 |
| 5,661,722 A | * | 8/1997 | Miyagi | 370/235 |
| 5,838,924 A | * | 11/1998 | Anderson et al. | 709/239 |
| 6,310,911 B1 | * | 10/2001 | Burke et al. | 375/224 |
| 6,359,857 B1 | * | 3/2002 | Ahmad et al. | 370/217 |
| 6,510,140 B1 | * | 1/2003 | Hamada | 370/242 |
| 6,545,976 B1 | * | 4/2003 | Gentile et al. | 370/216 |
| 2001/0046206 A1 | * | 11/2001 | Chan et al. | 370/222 |

FOREIGN PATENT DOCUMENTS

| | | | | |
|---|---|---|---|---|
| EP | 0924891 A1 | 12/1997 | | |
| EP | 0 928 083 A | 7/1999 | | |
| JP | 000924891 A1 | * 6/1999 | ............. | H04L/1/24 |
| JP | 411225131 A | * 8/1999 | ............. | H04L/1/00 |

OTHER PUBLICATIONS

Habisreitinger W et al: "Effektives Testen Synchroner Ringe" Nachrichtentechnik Elektronik, Veb Verlag Technik. Berlin, DE, vol. 48, No. 5, (Sep. 1, 1998)—pp. 9, 12, 14 *p. 14, col. 1, lines 14 * * p. 14; figure 6*.

Friedman H et al: "New Measurement for Digital Networks" Funkschau, Franzis–Verlag K.G. Munchen, DE, vol. 63, No. 21 (Oct. 4, 1999) pp. 41–43* p. 43, col. 1, line 17–line 34**p. 43; figure 4*.

Bonnani P et al: "Automatic Line Protection Testing: SDH Equipment with Optical Fibre Amplifier Systems" Proceedings of the Instrumentation and Measurement Technology Conference. Advanced Technologies on I & M. Hammatsu May 10–12 1994, New York, IEEE, US, vol. 3, CONF. 10 (May 10, 1994), pp. 1397–1399, *abstract* parts I and II.

* cited by examiner

*Primary Examiner*—Seema S. Rao
*Assistant Examiner*—Michael J. Moore, Jr.

(57) ABSTRACT

A data analyzer system measures the duration of a service disruption event in an asynchronous transfer mode (ATM) data transmission channel carrying an ATM stream of identifiable data cells in a defined order. The data analyzer system determines whether or not any of the data cells have been corrupted in transmission through the data transmission channel during transmission disruption. A timer determines a service disruption event duration upon elapse of a predetermined guard time.

11 Claims, 6 Drawing Sheets

ATM SERVICE DISRUPTION MEASUREMENT

TECHNICAL FIELD

The present invention relates to the measurement of a time interval during which asynchronous transfer mode (ATM) transmission of data in a data transmission channel is disrupted.

BACKGROUND ART

A process called "protection switching" is used in linear and ring Synchronous Digital Hierarchy (SDH) networks, sometimes called Synchronous Optical Networks (SONET), in order to re-establish asynchronous transfer mode (ATM) transmission of data when the performance of a data transmission channel is degraded, the channel is cut, or otherwise disrupted. This can happen because of a cut to an optical fibre, or equipment failure at end points or switching points in the network. Such service disruption events can lead to an unrecoverable loss of data, and so it is important to be able to quantify the possible loss up until the time protection switching re-establishes error-free transmission of data. Such testing is often done when an SDH network or part of a network is installed and commissioned.

It is not enough simply to verify that protection switching will be activated when the transmission of data is disrupted. To minimise the disruption to data transmission, the protection switching must be completed within specified time limits recommended by the standards ITU-T Recommendations G.783 and G.841. It is then therefore necessary to measure or estimate the protection switching performance of SDH network equipment to compare this against the ITU-T Recommendations.

ATM data transmission consists of identifiable data cells transmitted in a defined order along an ATM Virtual Channel, i.e. a group of ATM data cells each having the same header. More than one such ATM virtual channel may undergo protection switching in a service disruption event. A service disruption event can be simulated in testing by transmitting ATM data along one or more virtual channels, the data having a data transmission rate comparable to the expected utilisation of the virtual channels, and then by disconnecting or breaking a fibre or by disabling equipment using the virtual channels, such as an ATM switch. Although the so-called "physical layer", the fibres and connecting equipment, can be reconfigured very quickly to establish new virtual channels, the data cell stream may suffer impairments, such as erroneous detected data in a cell, lost cells, or misinserted cells where the ordering of received cells is incorrect.

One simple way of estimating if the protection switching is within the recommended limits is to count the number of lost or errored cells, and then divide this number by the cell transmission rate. If 100 cells are lost or errored at a transmission rate of 100,000 cells per second, then the duration of the service disruption event can be estimated as 10 ms. It has been found, however, that this simple way of estimating the extent of a service disruption event, overestimates the effectiveness of protection switching in reestablishing data transmission in an ATM network.

It is an object of the invention to provide an improved method and apparatus for measuring the duration of a service disruption event in an asynchronous transfer mode network.

DISCLOSURE OF INVENTION

According to the invention, there is provided a method of measuring the duration of a service disruption event in an asynchronous transfer mode (ATM) data transmission channel, using a data analyzer that has both a disruption timer and a guard timer, the method comprising the steps of:

a) providing an ATM stream of data into the data transmission channel, the data comprising a stream of identifiable data cells in a defined order;

b) detecting with a data analyzer the stream of data after transmission through the data transmission channel in order to determine whether or not any of the data cells have been corrupted in transmission through the data transmission channel;

c) disrupting the transmission of the stream of data through the data transmission channel so that at least some of the cells are corrupted;

d) using the disruption timer to time the service disruption event when a first corrupted data cell is detected by the data analyzer;

e) using the guard timer to time a guard time interval when a subsequent data cell that is not corrupted is detected by the data analyzer whilst continuing to use the disruption timer to time the service disruption event; and then either f) resetting the guard timer if the data analyzer has detected a further corrupted data cell prior to the guard timer timing a predetermined guard time; or g) determining the duration of the service disruption event from the disruption timer when the guard timer has timed the predetermined guard time.

A protection switching event will often include a period of increased error rate for data in cells, for example due to impaired signal-to-noise levels, or increased timing jitter, prior to a complete loss of cells. Some cells can be lost completely, and others can be in the wrong order or misinserted when the data cells are received. In all of these cases, the data cells have become corrupted. The data analyzer may therefore characterise corrupted data cells according to whether cells have been errored, for example, comprising data which is in error according to a cyclic redundancy check (CRC), or lost or misinserted.

The service disruption event therefore lasts at least from the last uncorrupted data cells prior to the switching event up until the time when data cells are again consistently uncorrupted. The guard timer therefore accommodates the observed performance of switching events, in which isolated uncorrupted cells or groups of consecutive uncorrupted cells can be transmitted, so that the duration of the service disruption event is measured by the disruption timer as continuing even when some correct data cells are being transmitted. The predetermined guard time can then be selected empirically according to the performance of typical protection switching events.

In step g) the duration of the service disruption event may be a time measured from a start time prior to detection by the data analyzer of the first corrupted data cell until an end time at or following the consistent resumption of uncorrupted data cells. The end time may be at a time prior to the time at which the guard timer has reached a time at least as great as the guard time in step g).

Including a proportion of an appropriate predetermined guard time in the measured disruption time, whether at the beginning and/or the end of the measured period, provides the benefit that the measurement does not underestimate the performance of the switching event in comparison with the performance recommended under international standards.

The start time may be a time no later than the last uncorrupted data cell before the service disruption event, and in a preferred embodiment of the invention, the start time may be in advance of this time, for example being a time which precedes said last uncorrupted data cell by no more than the guard time. The guard time then serves the purpose of providing a conservative measure of both the start and the end of the service disruption event.

In some circumstances, it may be necessary to measure the service disruption event hen there is a prolonged break in the data cell stream. In this case, when the prolonged break is at the start of the protection switching event, the start time may be a time that may precede said last uncorrupted data cell by more than the guard time when there is a gap in the stream of data cells following the last uncorrupted data cell greater than the guard time.

When cells are lost or misinserted, it may be that cells arrive in the right order after a series of erroneously inserted cells. It will not be possible to say with any certainty that cells are again arriving in the correct order until more than one such correct cell has been received. Therefore, in step e) said subsequent data cell may be the second consecutive data cell that is not corrupted as detected by the data analyzer.

Preferably, in step e) the guard time is timed starting from the detection of the last corrupted data cell, rather than, for example, the arrival of the next and first uncorrupted data cell towards the end of the protection switching event.

In a preferred embodiment of the invention, step b) is performed using the ITU-T Recommendation O.191.

Also according to the invention, there is provided a data analyzer system for measuring the duration of a service disruption event in an asynchronous transfer mode (ATM) data transmission channel carrying an ATM stream of identifiable data cells in a defined order, the data analyzer system comprising: error detection means for determining whether or not any of the data cells have been corrupted in transmission through the data transmission channel when the transmission is disrupted; a disruption timer for timing the service disruption event starting when a first corrupted data cell is detected by the error detection means; a guard timer for timing a guard time interval when uncorrupted data cells are detected by the error detection means; and control means for controlling the operation of the disruption timer and guard timer in response to the determination by the error detection means of whether or not any data cells have been corrupted; the disruption timer being operable to time a service disruption event from the start of the disruption event until the guard timer has timed a predetermined guard time, and the guard timer being operable to time the guard time interval when corrupted data cells are followed by a resumption of uncorrupted data cells.

BRIEF DESCRIPTION OF DRAWINGS

The invention will now be described in further detail, and by way of example with reference to the accompanying drawings, in which.

BEST MODE FOR CARRYING OUT THE INVENTION, & INDUSTRIAL APPLICABILITY

Figure 1:
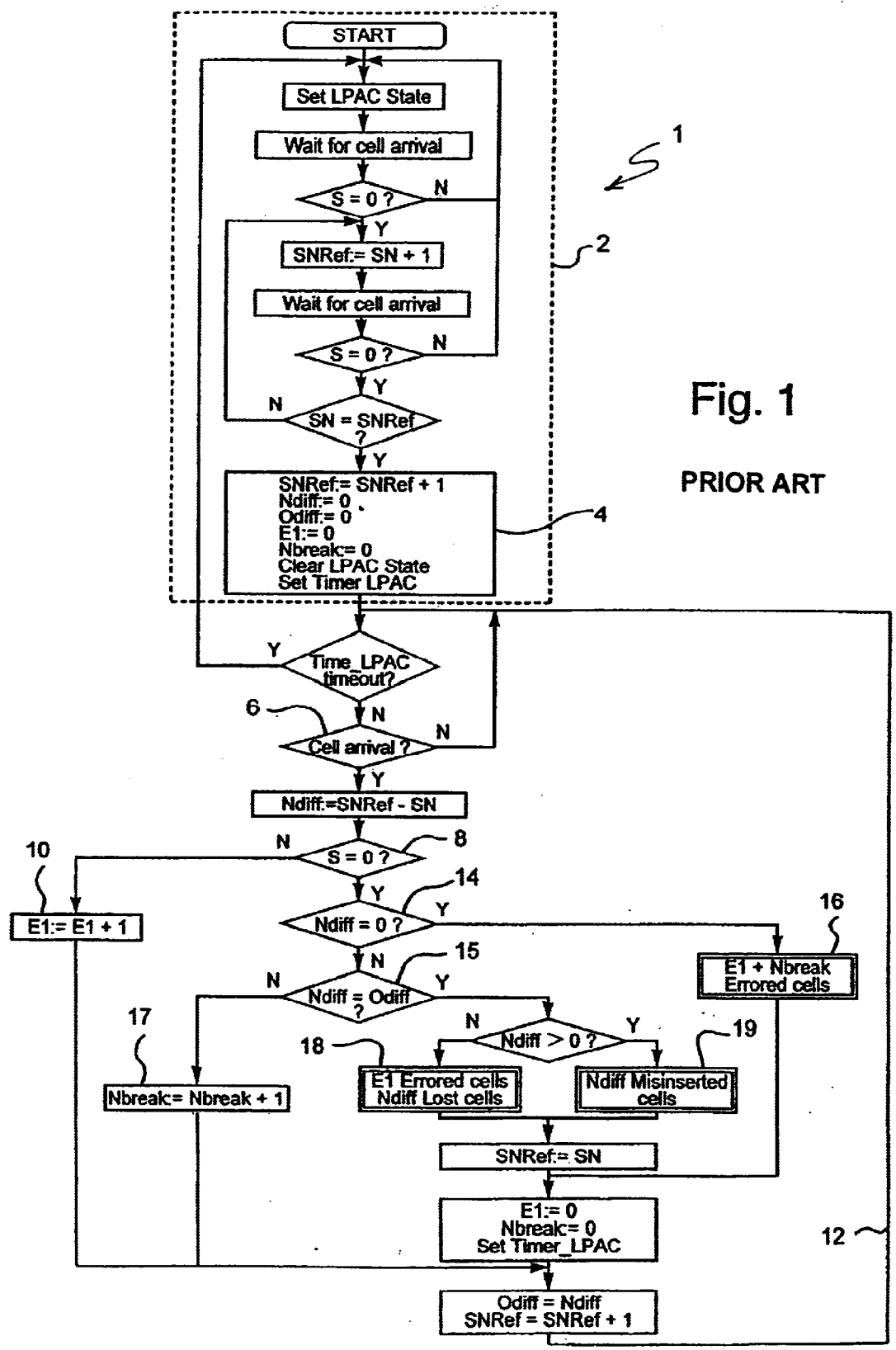
FIG. 1 is a flow diagram taken from the standard ITU-T Recommendation O.191, showing the conventional way of detecting errors in an ATM data channel during a protection switching event.

FIG. 1 is a flow diagram I taken from the standard ITU-T Recommendation O.191. This is used to detect errors in an ATM data channel during a protection switching event. The diagram 1 is well understood by those skilled in the art and so will be described briefly.

A protection switching test of ATM network equipment is normally done when the equipment is out of service. A test stream of ATM data cells therefore needs to be provided, and it is best if this test stream matches closely the expected data traffic when the equipment is in service. The test stream consists of data cells that have consecutively incremented header serial numbers (SN). The expected serial number of a data cell arriving at the test equipment is SNRef. The values Ndiff and Odiff are defined by:

Ndiff=SNRef−SN for the current cell

Odiff=SNRef−SN for the previous cell

The term S is a cyclic redundancy check (CRC) on data in the data cell. When S is not equal to zero, a data error is present according to the CRC-16 syndrome.

After the data is synchronised, the flow diagram 1 initialises 4 these and other terms, and if a data cell arrives within an expected time 6, the results of the synchronisation are analyzed, starting at step 8, which checks if the CRC has detected a data error in a cell. If so, then in step 10 an error counter value E1 is incremented by one. The test sequence then loops back 12 to await the next data cell. If this has no errors detected by the CRC, then the next check at step 14 is whether the sequence number was found to be correct. If so, then the algorithm proceeds to step 16 where it produces as an output the number of detected error cells, which is here just the non-zero value of E1.

If, on the other hand, the sequence number is not as expected in step 14, then this may because cells have either been lost or misinserted (i.e. in the wrong order). Here there are two possibilities, as shown in step 15. Either the sequence number is unexpected and not consecutive with the previous sequence number, in which case in step 17 a cell sequence error counter is incremented, or the sequence number although unexpected is consecutive with the previous cell sequence number. In this latter case, although cells have previously been either lost or misinserted, the cell stream has settled down with at least two consecutive data cells with no CRC errors and with consecutive sequence numbers. It is then possible to determine whether or not cells have been either lost and/or errored, or alternatively misinserted. The number of such lost/errored or misinserted cells is then generated as alternative outputs in steps 18 and 19.

If a number of cells have both CRC errors and sequence errors, then both the CRC error counter and cell sequence error counted will have been incremented in steps 10 and 17, and this result will become available as an output from step 16.

Although this flow diagram 1 does provide a measure of the type and number of such detected data cell errors, it does not provide a good measure of the effective time during which a protection switching event has caused errors. It is therefore difficult to use the ITU-T O.191 algorithm to test whether or not a protection switching event is in conformance with other standards, such as the standards ITU-T Recommendations G.783 and G.841

Figure 2:
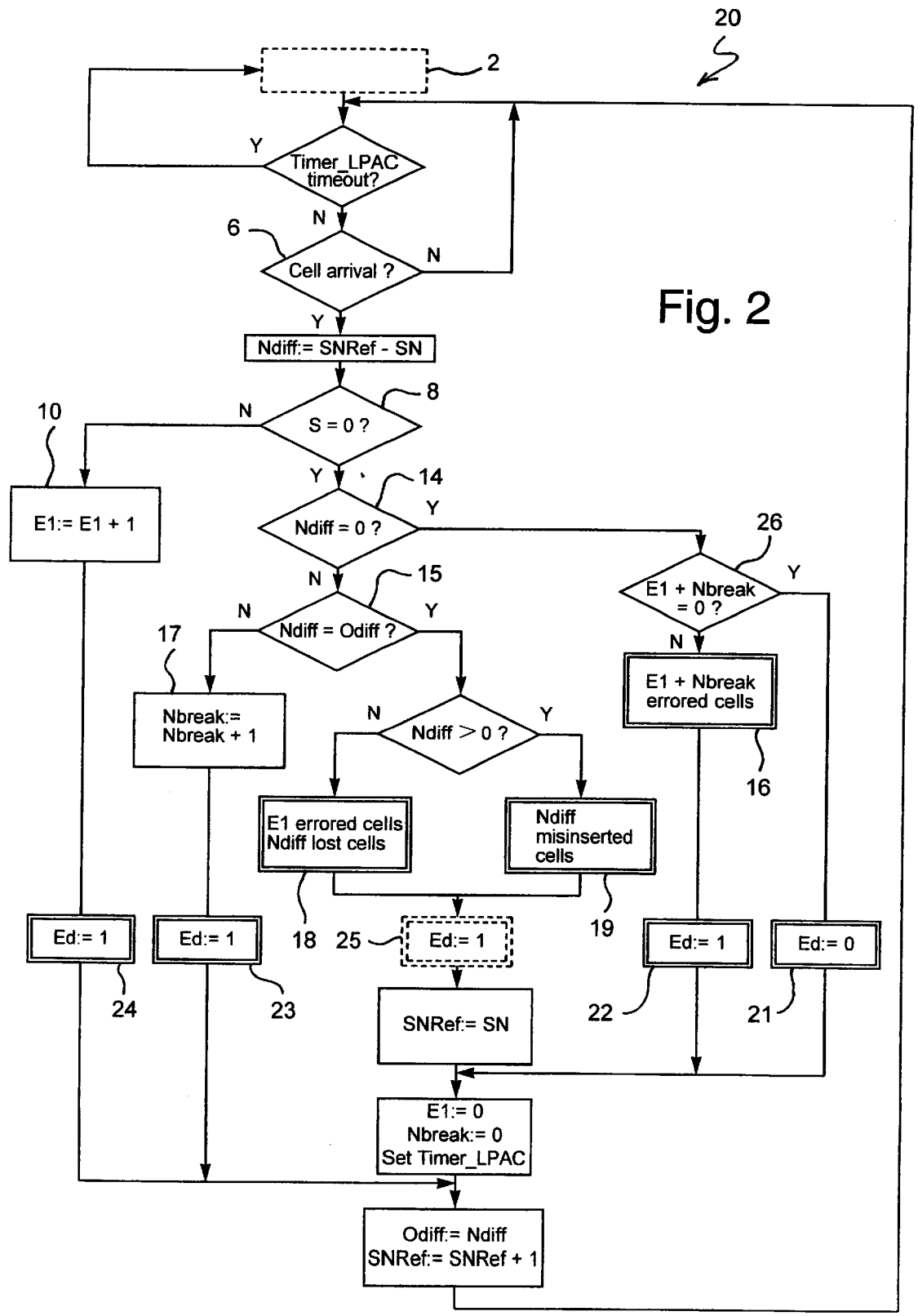
FIG. 2 is a flow diagram showing how the ITU-T Recommendation O.191 is modified as a decision flow diagram, for use with the method according to the invention for measuring the duration of a service disruption event in an asynchronous transfer mode (ATM) data transmission channel.

FIG. 2 shows how the flow diagram 1 can be modified to provide more useful information in the form of error decisions. For simplicity, the same reference numerals as before are used in FIG. 2 for corresponding steps of the decision flow diagram 20. Here, several decision points 21,22,23,24 (or optionally those numbered 21,22,25) have been introduced that generate as outputs a value $E_d$, that is either zero if no errors have been detected, or one, if there has been a detected error. One of the decision points 22 generates an error decision $E_d=1$ immediately following the output step 22. in which data cells in a previous data cell have been found to have a CRC error or unspecified sequence errors. Two other decision points 23 and 24 are on the paths in the flow diagram leading from the tests in steps 8 and 15 that found respectively either a CRC error or an unspecified sequence error in the present data cell.

Optionally, instead of decision points 23 and 24, the decision point 25 may alternatively be used to generate an error decision $E_d=1$ immediately following the alternative output steps 18,19 that give more specific information of the type of sequence error.

With either alternative of decision points 23/24 or 25, a final decision point 21 generates a no-error decision $E_d=0$ with a new test in step 26 that verifies that there have been no previous CRC or unspecified sequence errors following steps 8 and 14. This also verifies that there are no such errors in the data cell currently under test. The no-error result is therefore produced only when there have been at least two such consecutive error free data cells.

Figure 3:
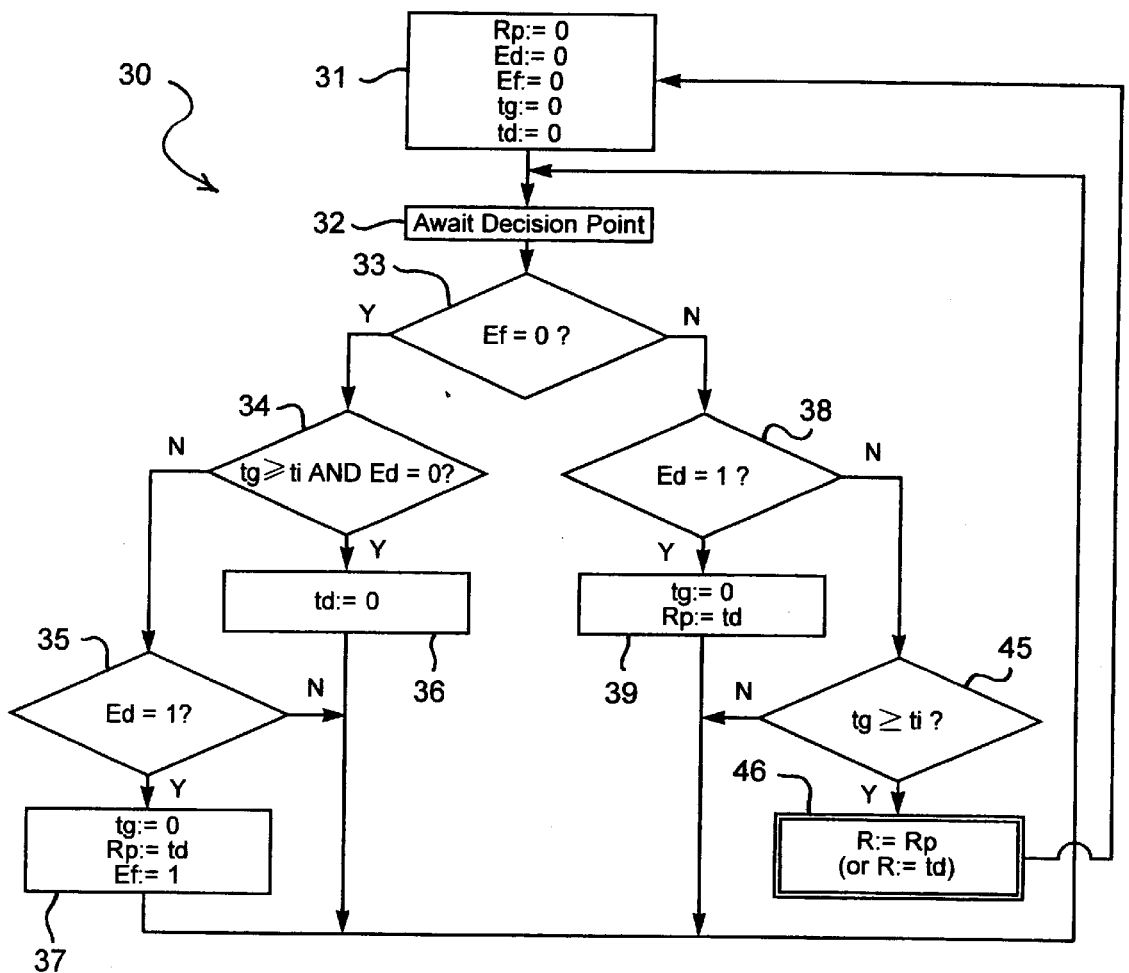
FIG. 3 is a disruption measurement flow diagram showing how a guard timer and a disruption timer are used with decision point outputs from the flow diagram of FIG. 2 in the method according to the invention.
Figure 4:
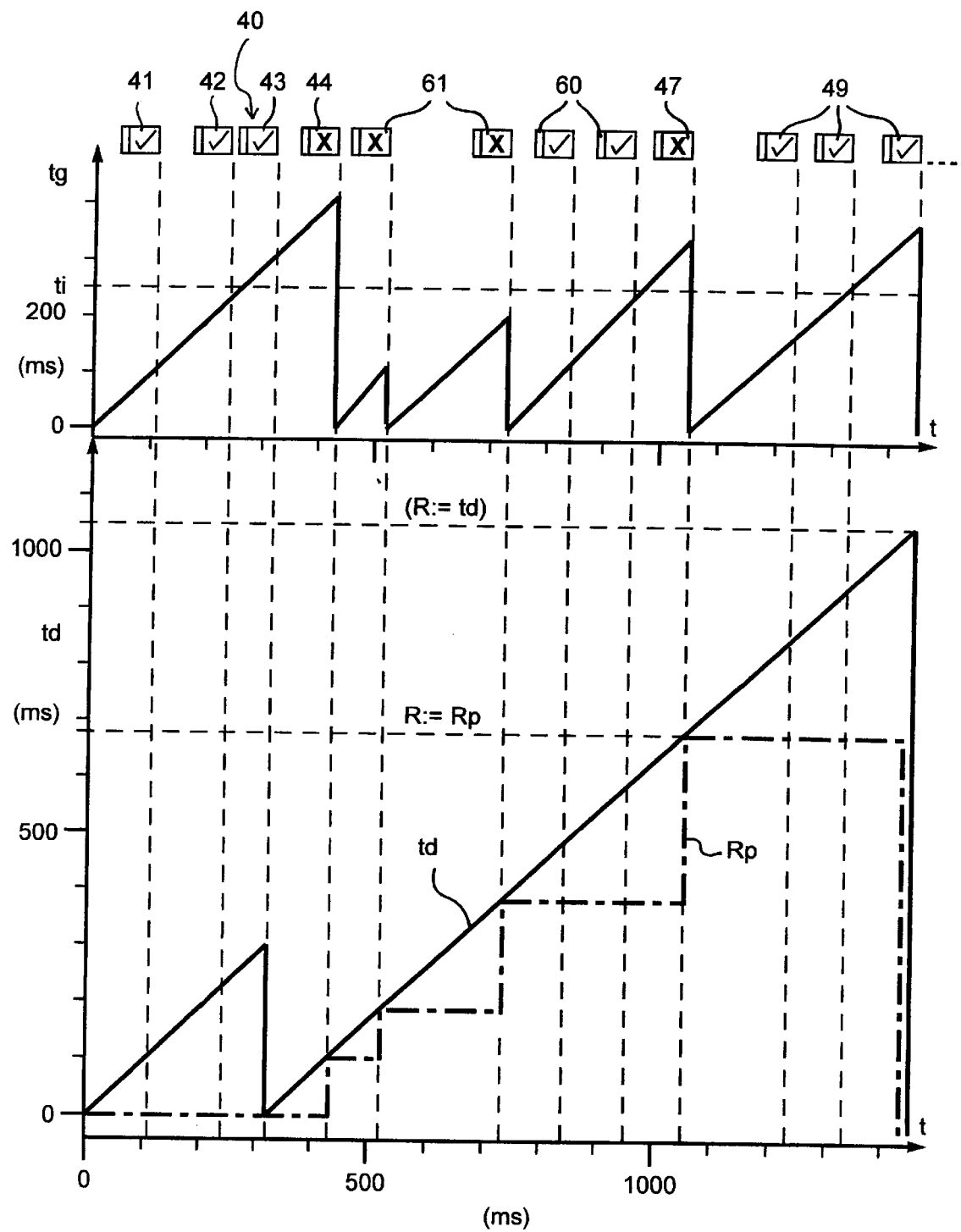
FIGS. 4 and 5 show timing diagrams illustrating how correct and corrupted data cells are detected and interact with the disruption measurement flow diagram of FIG. 3.
Figure 5:
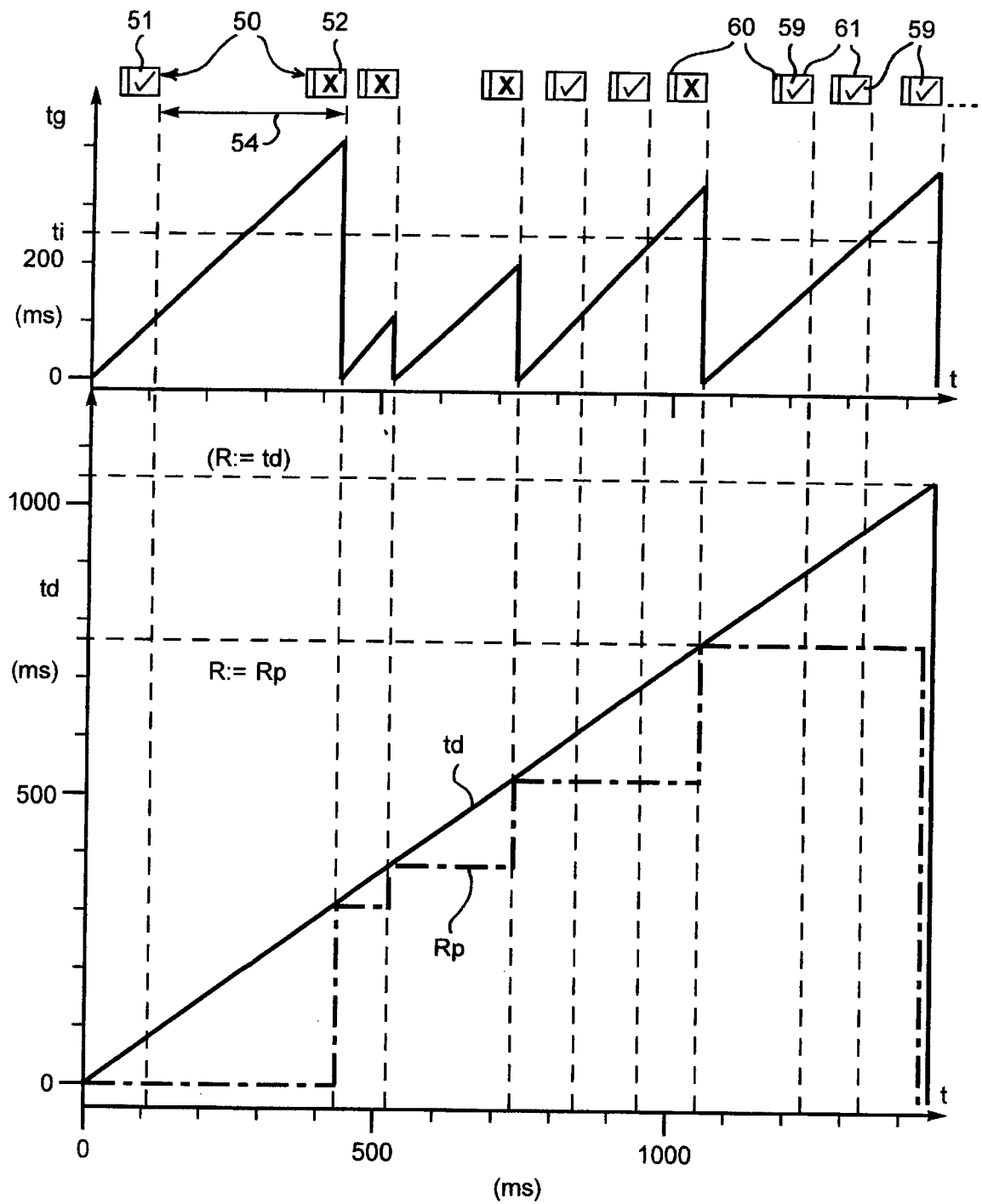

FIG. 3 shows a disruption measurement flow diagram 30 that uses the error decision outputs $E_d$ from the decision flow diagram of FIG. 2. FIGS. 4 and 5 show the results of the disruption measurement for two simplified example streams of cell data 40,50, each of which contains a header 60 with a sequence number followed by data 61. Data cells for which the sequence number is as expected, and the data is error-free are marked by ticks, and data cells that have an unexpected sequence number or erroneous data are marked by crosses.

The first step in the disruption measurement flow diagram 30 is an initialisation step 31 in which certain values are initialised to zero, namely, a provisional disruption time value $R_p$, the decision value $E_d$, an error flag value $E_f$, a time value output from a guard timer $t_g$, and a time value output from a disruption timer $t_d$. The guard timer value $t_g$ and disruption timer value $t_d$ are then set to run, while the disruption measurement flow diagram 30 awaits in step 32 an error decision point 21–25 to be reached in the decision flow diagram 20.

Here a first data cell 41,51 is correct, and in FIG. 4 this is followed by two other correct data cells 42,43, before a first errored data cell 44. In FIG. 5 there is just one correct data cell 51, followed after an extended interval 54 by an errored data cell 52. In both cases, the first errored data cell is followed by alternating correct and errored data cells, ending with a continuous stream of correct data cells 49,59.

When a first error decision point 21–25 has been reached, a test 33 is made as to whether or not the error flag value $E_f$ is zero. On the first pass after the initialisation step 31, error flag is always zero, whether or not the first data cell 41,51 is correct, and so the path branches to test in step 34 whether or not the guard time value $t_g$ is greater than a predetermined guard time $t_i$ AND the error decision value $E_d$ is zero (i.e. no error). Here, although the error decision value $E_d$ is zero, the guard timer value $t_g$ is still below the guard time $t_i$, and so the path branches to the next test 35 which is whether or not the error decision value $E_d=1$, which it is not. The path then loops back to step 32 awaiting the next decision. During this time, both the guard timer value $t_g$ and disruption timer value $t_d$ each continue to advance.

In FIG. 4, the next decision is again no-error $E_d 0$, and because the guard timer value $t_g$ is still below the predetermined guard time $t_i$, the same path is taken through the disruption measurement flow diagram 30. For the third decision, although the data cell 43 is correct, the guard timer has exceeded the guard time $t_i=250$ ms, and so at step 34 the test is true. This causes the path to branch to a step 36 in which the disruption time value $t_d$ is reset to zero. The purpose of this is to prevent if possible the start of the measured disruption period from being more than the guard time $t_i$ before the arrival of the first detected errored cell.

Continuing with the description for FIG. 4, the next decision point generates a detected error value $E_d=1$, and so at step 35, the path branches to an update step 37 in which the guard timer value $t_g$ is reset to zero, the provisional disruption period $R_p$ is set to be the current value of the running disruption timer $t_d$, and the error flag $E_f$ is set to one. From this point until the end of the disruption measurement process, the error flag $E_f$ remains at one, and so following the next decision point, the path at test 33 branches to the right to a test 38 as to whether or not the error decision value $E_d$ is one or zero. Since the error cells are in the example alternating between correct and errored, on error detected passes, the test 38 will branch to a step 39, in which the guard timer is reset and the provisional disruption time value $R_p$ is loaded with the current disruption time $t_d$, and on other passes in which no error is detected, the test 38 branches to a step 45 in which a test is made as to whether or not the guard timer value $t_g$ has reached or exceeded the predetermined guard time $t_i$. If the guard time value $t_g$ is less than the guard time $t_i$, then the path loops back to await 32 the next error decision. If, however, the guard timer value $t_g$ has reached or exceeded the guard time $t_i$, then a state has been reached in which there has been a consistent period of error free detection of data cells 49 sufficient to end the disruption measurement. The path then branches to output step 46, in which an output disruption time result R is loaded with the value of the most recent update of the provisional disruption time value $R_p$, corresponding with the detection time of a last-detected errored cell 47. This gives an accurate measure of the end time of the data cell disruption.

Optionally, if the guard time $t_i$ is comparable to a few intervals between data cells, then it may be desired to load the output disruption time result R with the final disruption timer value $t_d$. This would give a more conservative measure of the total disruption time. Either way, the duration of the service disruption event is determined from the disruption timer when the guard timer has timed the predetermined guard time.

The arrangement of correct and errored data cells in FIG. 5 is broadly similar to that of FIG. 4. The difference is that the first correct data cell 51 is followed after an extended interval 54 by a first errored data cell 52. The result in the disruption measurement flow diagram 30 is that the disruption timer value $t_d$ is not reset in step 36 prior to the first errored cell 52. Therefore, the disruption timer value $t_d$ continues to increment even through the extended interval 54 is longer than the guard time $t_f$. This however, gives a safe measure of the duration of a service disruption event, as in many cases it is likely that several data cells will be lost at the start of the disruption, for example when a data transmission fibre is cut.

Figure 6:
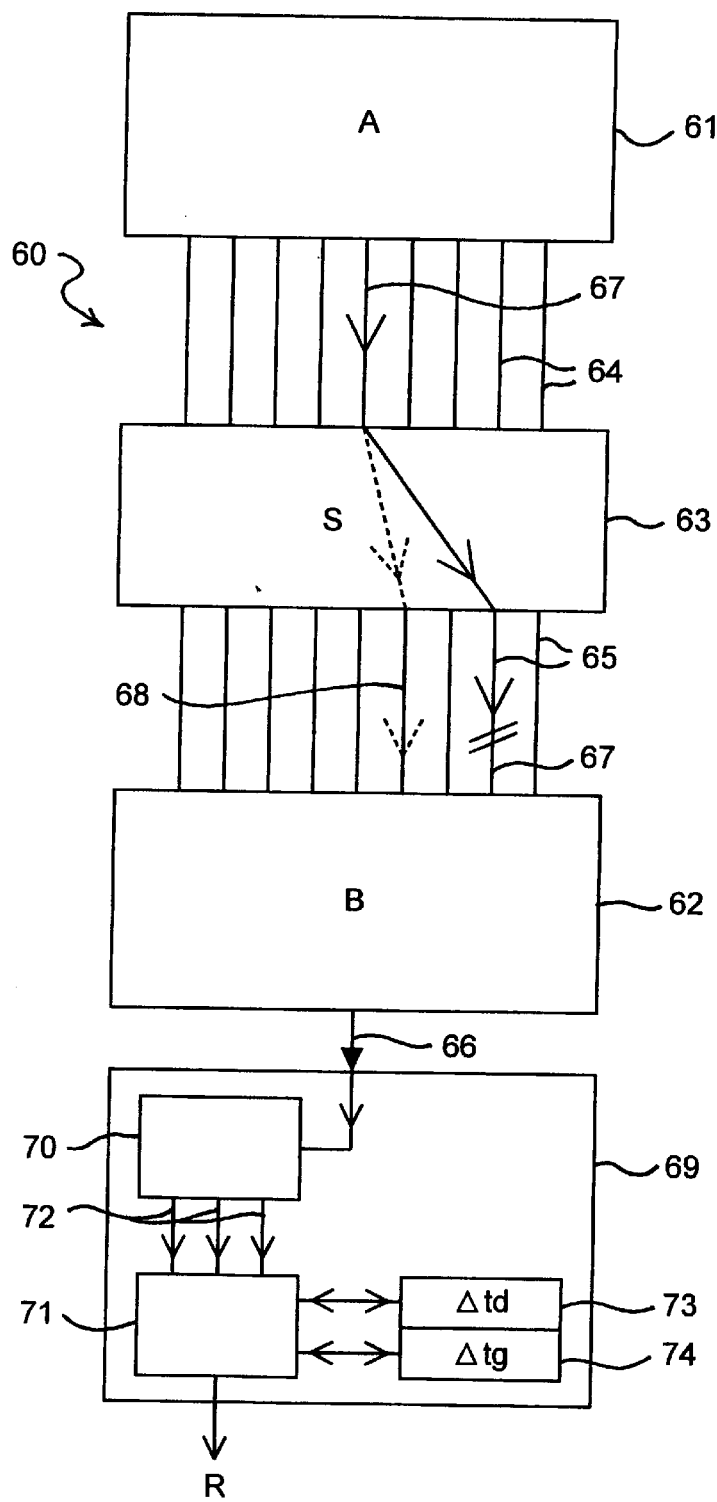
FIG. 6 is a schematic block diagram of an ATM network with data channels undergoing a protection switching event with apparatus embodying the invention according to the invention.

FIG. 6 shows a simplified schematic diagram of apparatus 60 embodying the invention. An ATM network comprises a data source (A) 61 that is connected to a data receiver (B) 62 via a network switch (S) 63. A number of possible virtual channels 64,65 connect the switch to the data source 61 and data receiver 62.

The data receiver 62 provides an output 66 of a particular data stream received from the source 61. If one of the virtual channels 67 carrying that particular data stream becomes cut or degraded, then protection switching will create a new virtual channel 68. A data analyzer 69 connected to the data output 66 can then be configured to perform the method of the invention. For example, error detection means such as a microprocessor or application specific devices 70 can be programmed or configured to carry out the steps in the flow diagram of FIG. 2 to generate error decision outputs 72. A separate or integral controlling processor 71 receiving the error decision can then perform the steps of the flow diagram of FIG. 3. On-board or separate timers 73,74 can then be controlled by one of the processors 70,71 to produce the guard timer value $t_g$ and disruption timer $t_d$ value. Thus, the data analyzer 69 can generate a disruption time result R as described above.

The invention therefore provides a convenient method and apparatus for measuring the duration of a service disruption event in an asynchronous transfer mode network.

What is claimed is:

1. A method of measuring the duration of a service disruption event in an asynchronous transfer mode (ATM) data transmission channel, using a data analyzer that has both a disruption timer and a guard timer, the method comprising the steps of:
   a) providing an ATM stream of data into the data transmission channel, the data comprising a stream of identifiable data cells in a defined order;
   b) detecting with a data analyzer the stream of data after transmission through the data transmission channel in order to determine whether or not any of the data cells have been corrupted in transmission through the data transmission channel;
   c) disrupting the transmission of the stream of data through the data transmission channel so that at least some of the cells are corrupted;
   d) using the disruption timer to time the service disruption event when a first corrupted data cell is detected by the data analyzer;
   e) using the guard timer to time a guard time interval when a subsequent data cell that is not corrupted is detected by the data analyzer whilst continuing to use the disruption timer to time the service disruption event; and then either
   f) resetting the guard timer if the data analyzer has detected a further corrupted data cell prior to the guard timer timing a predetermined guard time; or
   g) determining the duration of the service disruption event from the disruption timer when the guard timer has timed the predetermined guard time.

2. A method as claimed in claim 1, in which in step e) said subsequent data cell is the second consecutive data cell that is not corrupted as detected by the data analyzer.

3. A method as claimed in claim 1, in which in step e) the guard time is timed starting from the detection of the last corrupted data cell.

4. A method as claimed in claim 1, in which in step g) the duration of the service disruption event is a time measured from a start time prior to detection by the data analyzer of the first corrupted data cell until an end time at or following the consistent resumption of uncorrupted data cells.

5. A method as claimed in claim 4, in which the end time is at a time prior to the time at which the guard timer has reached a time at least as great as the guard time in step g).

6. A method as claimed in claim 4, in which the start time is a time no later than the last uncorrupted data cell before the service disruption event.

7. A method as claimed in claim 6, in which the start time is a time which precedes said last uncorrupted data cell by no more than the guard time.

8. A method as claimed in claim 6, in which the start time is a time that may precede said last uncorrupted data cell by more than the guard time when there is a gap in the stream of data cells following the last uncorrupted data cell greater than the guard time.

9. A method as claimed in claim 1, in which step b) is performed using the ITU-T Recommendation O.191.

10. A method as claimed in claim 1, in which the data analyzer characterises corrupted data cells according to whether cells have been errored, lost or misinserted.

11. A data analyzer system for measuring the duration of a service disruption event in an asynchronous transfer mode (ATM) data transmission channel carrying an ATM stream of identifiable data cells in a defined order, the data analyzer system comprising:
   error detection means for determining whether or not any of the data cells have been corrupted in transmission through the data transmission channel when the transmission is disrupted;
   a disruption timer for timing the service disruption event starting when a first corrupted data cell is detected by the error detection means;
   a guard timer for timing a guard time interval when uncorrupted data cells are detected by the error detection means; and
   control means for controlling the operation of the disruption timer and guard timer in response to the determination by the error detection means of whether or not any data cells have been corrupted;
   the disruption timer being operable to time a service disruption event from the start of the disruption event until the guard timer has timed a predetermined guard time, and the guard timer being operable to time the guard time interval when corrupted data cells are followed by a resumption of uncorrupted data cells.

* * * * *